US007023338B1

(12) United States Patent
Foth

(10) Patent No.: US 7,023,338 B1
(45) Date of Patent: Apr. 4, 2006

(54) APPARATUS, SYSTEMS AND METHODS FOR AQUATIC SPORTS COMMUNICATIONS

(76) Inventor: Robert A. Foth, 548 E. Virginia Ave., Glendora, CA (US) 91741

(*) Notice: Subject to any disclaimer, the term of this patent is extended or adjusted under 35 U.S.C. 154(b) by 14 days.

(21) Appl. No.: 10/630,448

(22) Filed: Jul. 29, 2003

Related U.S. Application Data

(60) Provisional application No. 60/400,215, filed on Jul. 31, 2002.

(51) Int. Cl.
G08B 1/08 (2006.01)

(52) U.S. Cl. .................... 340/539.13; 340/539.11; 340/539.26; 340/573.1; 340/571; 455/575.1; 455/575.5; 455/575.6; 441/89

(58) Field of Classification Search ......... 340/539.1, 340/539.13, 539.11, 539.26, 573.1, 571; 455/575.1, 575.5, 575.6; 441/89
See application file for complete search history.

(56) References Cited

U.S. PATENT DOCUMENTS

| 3,095,568 A | 6/1963 | Aine et al. ............ 343/709 |
| 3,103,005 A | 9/1963 | Hills ................... 340/286 |
| 3,122,736 A | 2/1964 | Weber .................. 340/366 |
| 4,116,237 A | 9/1978 | Birch .................. 128/142.7 |
| 4,456,797 A | 6/1984 | Olse ................... 179/156 R |
| 4,565,258 A | 1/1986 | Butler et al. ........... 181/192 |
| 4,584,718 A | 4/1986 | Fuller ................. 455/351 |
| 4,589,134 A | 5/1986 | Waldron .............. 381/90 |
| 4,683,587 A | 7/1987 | Silverman ............ 381/25 |
| 4,725,253 A | 2/1988 | Politte ................ 441/130 |
| 5,006,831 A | 4/1991 | de Solminihac ....... 340/573 |
| 5,029,293 A | 7/1991 | Fontanille ............ 340/573 |
| 5,144,285 A | 9/1992 | Gore ................... 340/573 |
| 5,234,144 A | 8/1993 | Iler .................... 224/191 |
| 5,251,326 A | 10/1993 | Silverman ............ 455/40 |
| 5,326,297 A | 7/1994 | Loughlin .............. 441/89 |
| 5,455,842 A | 10/1995 | Mersky et al. ......... 375/175 |
| 5,579,284 A | 11/1996 | May ................... 367/132 |
| 5,701,355 A | 12/1997 | Brannan et al. ....... 381/169 |
| 5,710,989 A | 1/1998 | Flood .................. 455/100 |
| 5,860,842 A | 1/1999 | Parr ................... 441/80 |
| 5,884,198 A | 3/1999 | Kese et al. ........... 455/575 |

(Continued)

OTHER PUBLICATIONS

Custom Protect Ear, Internet http://www.protectear.com/ca11.se1.html, printed from the Internet Feb. 14, 2002, 6 pages.

(Continued)

Primary Examiner—Julie Bichngoc Lieu
(74) Attorney, Agent, or Firm—Khorsandi Patent Law Group, A Law Corporation; Marilyn R. Khorsandi

(57) ABSTRACT

The exemplary embodiment of the present invention integrates a two-way communications device into a personal floatation device ("PFD"; sometimes also referred to herein as a "life vest"). Integration of the two-way communications device in the exemplary PFD embodiment would provide water ingress protection (water-proofing) of at least International Standard CEI/IEC 529: 1989:IPX7. In the exemplary embodiment, the two-way communications device integrated in the PFD would provide an antenna integrated into a shoulder of the PFD. The exemplary embodiment would further provide an advanced microphone, and an ear bud speaker. The exemplary embodiment would further provide signal processing to mitigate ambient noise and to enhance transmission of true vocal content. The exemplary transceiver of the exemplary embodiment of the present invention would be environmentally hardened and would be operable to communicate radio frequencies in a range between 462.5625 MHz and 467.7125 MHz.

21 Claims, 10 Drawing Sheets

U.S. PATENT DOCUMENTS

| | | | |
|---|---|---|---|
| D410,987 S | 6/1999 | Lucius | D21/805 |
| 6,061,457 A | 5/2000 | Stockhamer | 381/111 |
| 6,183,328 B1 | 2/2001 | Marshall | 441/89 |
| 6,206,000 B1 | 3/2001 | Folsom | 128/201.27 |
| 6,439,941 B1 * | 8/2002 | McClure et al. | 441/89 |

OTHER PUBLICATIONS

Custom Protect Ear, Internet http://www.protectear.com/ca4.se2.ap5.html, printed from the Internet Feb. 14, 2002, 2 pages.

Walker's, Target Ear and Target Ear II w/AFT, Product Summary, Internet http://www.walkersgameear.com/targetea.htm, printed from the Internet Feb. 14, 2002, 4 pages.

Foster Headphones & Headsets, Foster Culver Headsets, Internet http://www:fosterculver.com/hdstp.htm, printed from the Internet Mar. 9, 2002, 3 pages.

Micro Acoustic Transducers ("MAT"), Foster Culver Microspeakers, Internet http://ww.fosterculver.com/matp.htm, printed from the Internet Mar. 29, 2002, 5 pages.

OTTO Low Profile Earphone Kits, Internet http://www.botachtactical.com/otlowprofear.html, printed from the Internet Mar. 29, 2002, 5 pages.

Audio Products: Throat Microphones, Internet http://www.prymebattery.com/audio/throatmic.asp, printed from the Internet Oct. 26 ,2001, 1 page.

*PRYME Radio Products*, Internet http://www.adi-radio.com/company/contact/Default.htm, printed from the Internet Oct. 26, 2001, 1 page.

Holm Co, Holmberg GmbH & Co. KG, Elektroakustik, Dynamic Throat Microphone, Series 71-02-, Internet http://www.holmco.de, printed in Germany Mar. 2001, 1 page.

EARMARK, Earmark Microphones, Earmark, Inc., Hamden, CT, Internet http://www.earmark.com/microphones.htm, printed from the Internet Oct. 26, 2001, 1 page.

MICROPHONES, Internet http://www.luminaud.com/microphones.htm, printed from the Internet Oct. 26, 2001, 5 pages.

Special Electronics & Designs, Throat Microphones, Internet http://www.sed01.com/throatmic.shtml, printed from the Internet Oct. 26, 2001, 2 pages.

Special Electronics & Designs, Standard Products, Internet http://www.sed01.com/contacts.shtml, Special Electronics & Designs, Canada, printed from the Internet Oct. 26, 2001, 2 pages.

Welcome to the ears online shop, EARS plc online shop, Internet http://www/ears.pic.uk, printed from the Internet Oct. 26, 2001, 1 page.

Tactical Command Industries, Inc., Antioch, CA, Internet http//www.merchantmanager.com, printed from the Internet Oct. 26, 2001, 1 page.

GENESYS Throat Mic Up Close, Internethttp://www.connecti.com. printed from the Internet Oct. 26, 2001, 1 page.

Pilot Communications, Microphones—Electret and Dynamic, *Pilot Avionics/Pilot Communications*, Internet http://www/1.drive.net, printed from the Internet Oct. 26, 2001, 2 pages.

BACK, ears audio accessories, Internet http://www.ears.plc.uk, printed from the Internet Oct. 26, 2001, 1 page.

Motorola—CGISS—Accessories & Aftermarket Division, Audio Accessories, Internet http://ap.cgiss.motorola.com , Motorola Inc., printed from the Internet Oct .26, 2001, 4 pages.

Communication Accessories for Two-Way Radios, Throat Microphone, Internet http://www.ceotronicsusa.com, printed from the Internet Oct. 26, 2001, 2 pages.

NFS-RPS, We Build Solutions . . . , Internet http://www.nfsrps.com, printed from the Internet Oct. 26, 2001, 1 page.

Panzerheadsets, Internet http:www.german-militaria.com, printed from the Internet Oct. 26, 2001, 6 pages.

The Sea Com Water Sport Communicator is the Official "On Water Communication", Internet http://www.collett.mb.ca, Collett Electronics, printed from the Internet Mar. 27, 2002, 10 pages.

Off-Road.com's Internet http://www.off-road.com, printed from the Internet Mar. 28, 2002. Off-Road.com. 4 pages.

Snowmobile Online @Off-Road.com, Internet http://www.off-road.com, Offroad.com, printed from the Internet Mar. 28, 2002, 5 pages.

Rider-to-Rider Stereo Communicator with Cellular Phone Input, 13 pages.

Lockhart, Don, Equipment Rewiew, Nov. 11, 2000, HJC Chatterbox FRS Helmet Communicator, 2 pages.

Kriceri, Andrew, AAC Info and White Papers, Internet http://www.arc-rerc.com, RadioEar Corporation, New Eagle, PA, printed from the Internet Feb. 9, 2003, 3 pages.

* cited by examiner

APPARATUS, SYSTEMS AND METHODS FOR AQUATIC SPORTS COMMUNICATIONS

CROSS REFERENCE TO RELATED APPLICATIONS

Priority is claimed to U.S. Provisional Patent Application Ser. No. 60/400,215, titled "AQUATIC SPORTS COMMUNICATION DEVICE", filed on Jul. 31, 2002, the disclosure of which is incorporated for all purposes herein in full by reference as if stated in full herein.

FIELD OF THE INVENTION

The field of the present invention is communications systems, and more particularly, communications systems for use by aquatic sports participants.

BACKGROUND OF THE INVENTION

Two-way communications are used in aquatic sports environments to communicate, for example, between a person water-skiing, and a person driving the boat that is pulling the skier. Another example of aquatic sports communications use would be between a first person on a first personal water craft, such as, for example, a Jet Ski® or Sea-Doo®, and a second person on either a second personal water craft, or on the beach. Another example of aquatic sports communications use would be between surfers, and/or between surfers and people on the beach.

People who are participating in aquatic sports, such as water-skiing, surfing, kayaking, rafting and the like, must often use their hands to keep their balance, and/or to hold on to a ski rope, surf board, steering handle bars, or the like. Consequently, the aquatic sports participant often does not have time to manipulate controls, such as keys, on a communications device or otherwise provide tactile input. Accordingly, a two-way communications device for aquatic sports is needed that does not always require manual contact to operate.

People who are participating in aquatic sports are often traveling at high speeds and may contact the water with high impact. For example, a water-skier who is towed behind a power boat often travels at 35 miles per hour. If a water skier loses control and falls off the skis, the water skier may impact the water at approximately 35 miles per hour or more. A personal watercraft operator who falls from the craft, depending on speed and trajectory, can experience tremendous aquatic pressure. Further, if the operator falls from the craft, the high impact of the operator hitting the water could shear bulky equipment from the operator's head, such as a headset, or from the operator's body, possibly causing injury. Consequently, a communications system is needed for aquatic sports participants that would not interfere with participation in the sport, including unexpected dismounts and recovery.

Aquatic sports participants need freedom of movement. For example, a surfer might be able to wear a headset of some sort while surfing. However, while the surfer is surfing, a headset can shift position due to the high activity of the surfer. Further, an aquatic sports participant needs to be able to concentrate on the sport without distractions or impairment, such as from communications wiring and connections surrounding or wrapping around any part of the anatomy. Therefore, a communications system is needed for aquatic sports participants that would allow freedom of movement and at the same time, would provide communications stability.

Further, aquatic sports participants are subjected to extremes in shock, vibration, noise and exposure to water. Accordingly, a communications system is needed for aquatic sports participants that would provide robust performance when exposed to such extremes.

SUMMARY OF THE INVENTION

The exemplary embodiment of the present invention integrates a two-way communications device into a personal floatation device ("PFD"; sometimes also referred to herein as a "life vest"). Integration of the two-way communications device in the exemplary PFD embodiment would provide water ingress protection (water-proofing) of at least International Standard CEI/IEC 529: 1989:IPX7. In the exemplary embodiment, the two-way communications device integrated in the PFD would provide an antenna integrated into a shoulder of the PFD. The exemplary embodiment would further provide an advanced microphone, and an acoustic tube leading to the earpiece. The exemplary embodiment would further provide signal processing to mitigate ambient noise and to enhance transmission of true vocal content. The exemplary transceiver of the exemplary embodiment of the present invention would be environmentally hardened.

The exemplary two-way communications device for aquatic sports would comprise a life vest, and a two-way transceiver embedded in the life vest. The exemplary two-way communications device would further comprise an antenna connected to a shoulder portion of the life vest, wherein the antenna would be connected with wires to the two-way transceiver and wherein the wires would be embedded in the life vest. In the exemplary two-way communications device the transceiver would be sewn, or otherwise attached, in a recessed area embedded in the life vest. In the exemplary two-way communications device, the antenna would form an arc relative to the shoulder portion of the life vest; the antenna would have a first end that would be attached to a first portion of the shoulder portion of the life vest and a second end that would be attached to a second portion of the shoulder portion of the life vest. In the exemplary two-way communications device, the antenna would be shrouded with a material that webs the interior of the arc. The exemplary device would further comprise a microphone embedded in a collar portion of the life vest, and a flexible acoustic conduction tube connecting the earpiece to the transceiver. The transceiver of the exemplary device would operable to communicate radio frequencies in a range between 462.5625 MHz and 467.7125 MHz.

In the exemplary device, operation of the transceiver would be accomplished through vocal commands, and would not require, but could accept, manual tactile input. Someone with ordinary skill in the art will understand that the exemplary embodiment and alternative exemplary embodiments described herein are illustrative and nonlimiting; other variations are possible without departing from the spirit of the present invention. For example, operation of the transceiver could be accomplished through manual tactile input only.

BRIEF DESCRIPTION OF THE DRAWINGS

These and other features, aspects, and advantages of the present invention will become better understood with regard to the following description, appended claims, and accompanying drawings in which:

DETAILED DESCRIPTION OF THE INVENTION

Figure 1A:
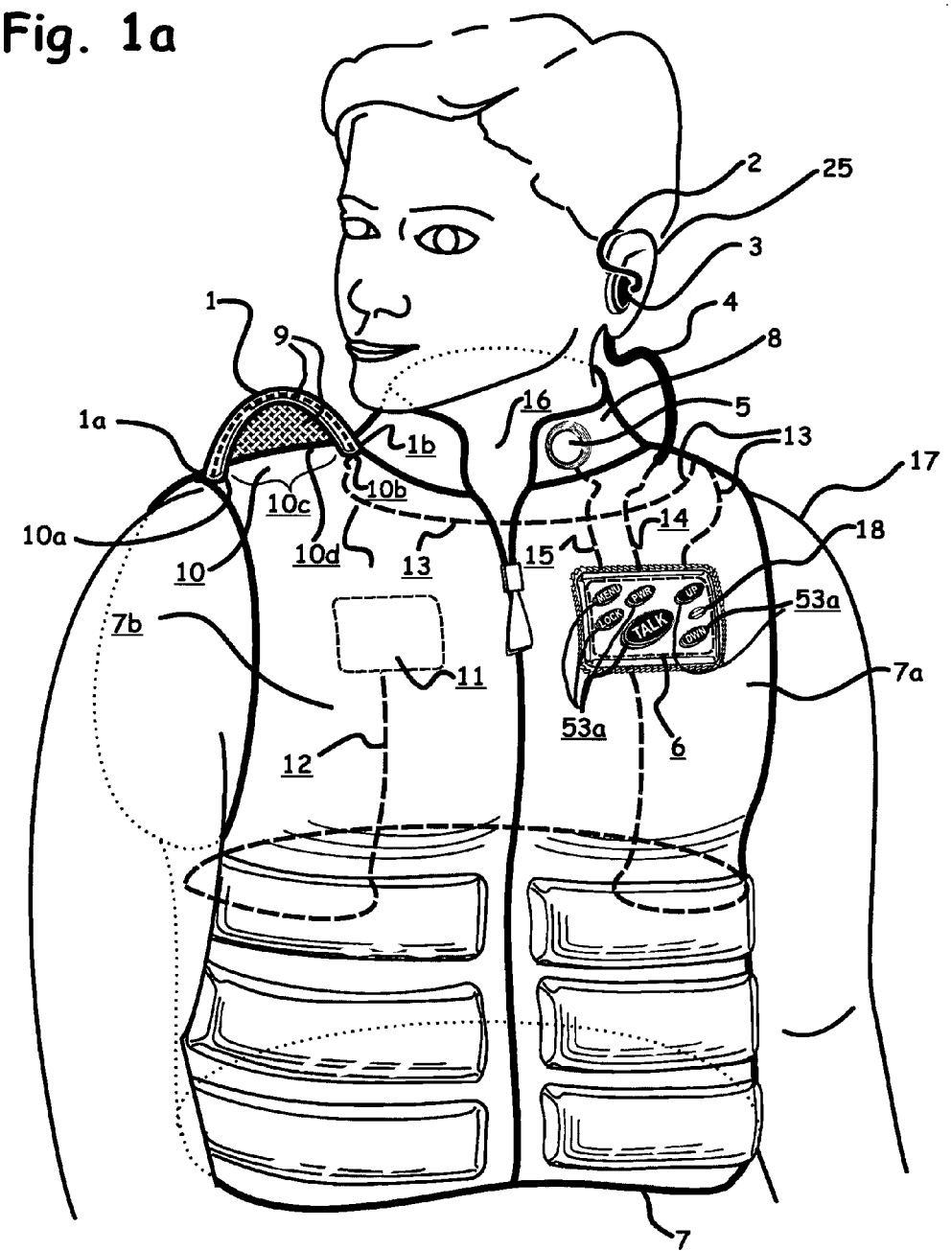
FIG. 1a is a perspective view of a human wearing an exemplary aquatic communications device embodiment of the present invention.

FIG. 1a depicts an exemplary life vest 7 in which an exemplary transceiver 6 is embedded in the life vest. In the exemplary embodiment depicted in FIG. 1a, the transceiver 6 is depicted with a dashed line to show that the transceiver 6 would be beneath the surface layer of the life vest 7. For example, the transceiver 6 could be embedded between interior and exterior layers of material comprising the life vest 7 so that the transceiver 6 would not be visible from either the interior or exterior surface of the life vest 7.

In the exemplary embodiment the present invention, the transceiver 6 would be operable to communicate using the Family Radio Service (FRS) portion of the radio frequency spectrum. The FRS is defined by the Code of Federal Regulation (CFR), section 47, part 95, which is incorporated herein for all purposes by reference. CFR section 47, part 95, governs personal telecommunications. The FRS radio spectrum is administered by the Federal Communications Commission (FCC). Frequency of FRS operation is between 462.5625 MHz and 467.7125 MHz. FRS is used primarily for voice communications. However, communication of tones and data is authorized.

There are advantages to using transceivers operable to communicate within the FRS spectrum for aquatic sports communications. One advantage is that the operable FRS frequency range (between 462.5625 MHz and 467.7125 MHz) facilitates the use of small antenna and other components due to the short wavelength at these frequencies.

Another advantage of using FRS-capable transceivers in the exemplary embodiment is that even though the propagation of these frequencies are predominately "line-of-sight," the propagation of these frequencies nevertheless provides for some diffraction around fixed objects. Further FRS utilizes an unlicensed FM (F3E narrow-band) modulation scheme that provides clear reception. The Effective Radiated Power (ERP) for the FRS capable transceivers is 0.500 watts; this ERP facilitates a range of approximately 2 miles, but does not interfere with third-party communications systems that are far away.

Another advantage of using FRS-capable transceivers in the exemplary embodiment is that a large variety of handheld FRS units are commercially available and are compatible for use with this invention. Due to the large volume market of FRS units, FRS-compatible components and technology are inexpensive.

Another advantage of using FRS-capable transceivers in the exemplary embodiment is that FRS provides 14 channels and 38 privacy codes. The high number of channels and privacy codes provides a large number of unique combinations so that a large number of users may operate privately in the same area at the same time.

Even though FRS would be used in the exemplary embodiment, it will be understood by someone with ordinary skill in the art that other frequency bands, such as, by way of nonlimiting example, the General Mobile Radio Service (GMRS), could be used without departing from the spirit of the present invention.

Continuing with reference to FIG. 1a, the exemplary embodiment of the present invention would provide an antenna 1. In the exemplary embodiment, the antenna 1 would be a quarter-wave monopole that would be connected to a shoulder portion 10 of the life vest 7. The exemplary antenna 1 would be flexible. In order to connect the exemplary antenna 1 to the shoulder portion 10 of the vest 7, a first end 1a of the antenna 1 would be connected to a first shoulder portion 10a at the apex 10d of the shoulder portion 10; a second end 1b of the antenna 1 would be connected to a second shoulder portion 10b at the apex 10d of the shoulder portion 10.

As depicted in FIG. 1a, the exemplary antenna 1 would have a length that is longer than the length 10c of the shoulder portion 10 of the life vest 7. Accordingly, when the first end 1a of the antenna 1 is connected to the first shoulder portion 10a and the second end 1b of the antenna 1 is connected to the second shoulder portion 10b, the exemplary antenna 1 would form an arc, or a half-loop, as depicted in FIG. 1a.

Figure 1B:
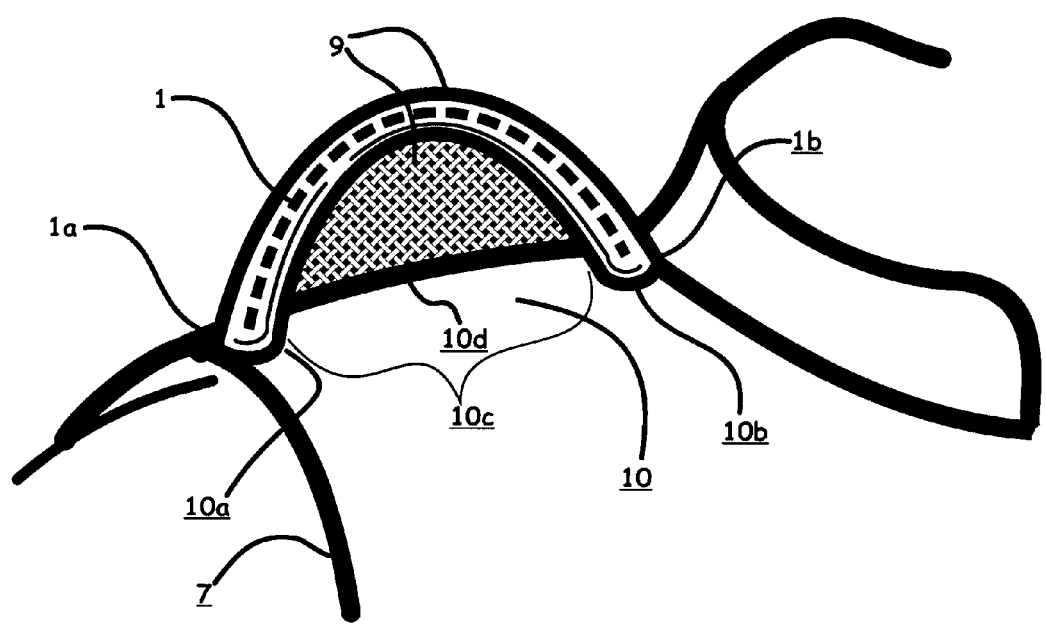
FIG. 1b is an enlarged perspective view of an exemplary antenna/shoulder assembly in the exemplary embodiment of the present invention.

FIG. 1b is an enlarged perspective view of an exemplary antenna/shoulder assembly in the exemplary embodiment of the present invention. The antenna 1 is depicted as a dashed line in both FIGS. 1a and 1b because, in the exemplary embodiment, the antenna 1 would be shrouded with material 9. The material 9 would be attached to the apex 10d of the shoulder portion 10 of the life vest 7.

The type and nature of exemplary antenna 1 would serve to maximize transmission and reception characteristics. When a user of the exemplary embodiment of the present invention is floating vertically in the water, the antenna 1 would not be submerged. Thus, reliable two-way communication could be maintained. Additionally, bending the antenna 1 into an arc would minimize the risk of injury to the eyes. Shrouding antenna 1 with material 9, would "web" the inside of the antenna arc, thereby minimizing accidental snagging of the antenna 1. The shoulder position of the antenna 1 would minimize transmission and reception shielding effects by the user's body 17 (shown in FIG. 1a). The shoulder positioning of the antenna 1 would also minimize the user's exposure to radio frequency radiation.

As will be understood by someone with ordinary skill in the art, various antenna lengths and "loading" schemes could be used without departing from the spirit of the present invention. Further, as will be understood by someone with ordinary skill in the art, vertical, folded, and helical antennas, as well as horizontal and flat "patch" antennas, could be used without departing from the spirit of the present invention.

Returning to FIG. 1a, an exemplary throat microphone 5 would be integrated into the collar 8 of the life vest 7. The throat microphone 5 would have an inherent immunity to high background noises such as wind, personal watercraft, and ski boat engines. When a user wears the exemplary life vest 7 with the throat microphone 5 integrated into the collar 8, the throat microphone 5 would properly position the throat microphone 5 near the larynx and vocal cords 16 of the wearer 17 without additional positioning effort. The integration of the throat microphone 5 in the collar 8 of the life vest 7 would protect the throat microphone 5 from entanglement and damage.

Some transceivers of common variety require tactile inputs to operate. In an aquatic sports environment, a device requiring tactile input could interfere with the wearer's participation in the sport. Tactile inputs can also be a source of potentially dangerous distraction that can interfere with the wearer's situational awareness. In the exemplary embodiment of the present invention depicted in FIG. 1a, tactile inputs would not be required to operate the transceiver 6. Rather, transceiver 6 would be operable with vocal commands received through the throat microphone 5 to control various functions of the transceiver 6. Secondary tactile controls, keypad buttons 53a, would be available such as for initially configuring the unit.

Continuing with reference to FIG. 1a, the exemplary embodiment of the present invention would provide an earphone 3. In the exemplary embodiment, earphone 3 would be connected to a transceiver 6 with flexible acoustic conduction tube 4. Acoustic conduction tube 4 would provide audio conduction between the earphone 3 and the transceiver 6. The earphone 3 would be made of a soft, conformal, elastomeric material for placement into the ear canal of the ear 25 of the wearer 17. This soft, conformal, elastomeric construction of earphone 3 will provide for a comfortable fit and would help dampen ambient noise. The acoustic conduction tube 4 runs through the middle of the earphone 3. A section of acoustic conduction tube 4 is rigid and forms earclip 2. Earclip 2 mechanically secures earphone 3 on the ear.

Continuing with reference to FIG. 1a, a power source, such as at least one battery pack 11, would be provided. In the exemplary embodiment depicted in FIG. 1a, the battery pack 11 is depicted with a dashed line to show that the battery pack 11 would be beneath the surface layer of the life vest 7. For example, the battery pack 11 could be embedded between interior and exterior layers of material comprising the life vest 7 so that the battery pack 11 would not be visible from either the interior or exterior surface of the life vest 7.

Figure 10:
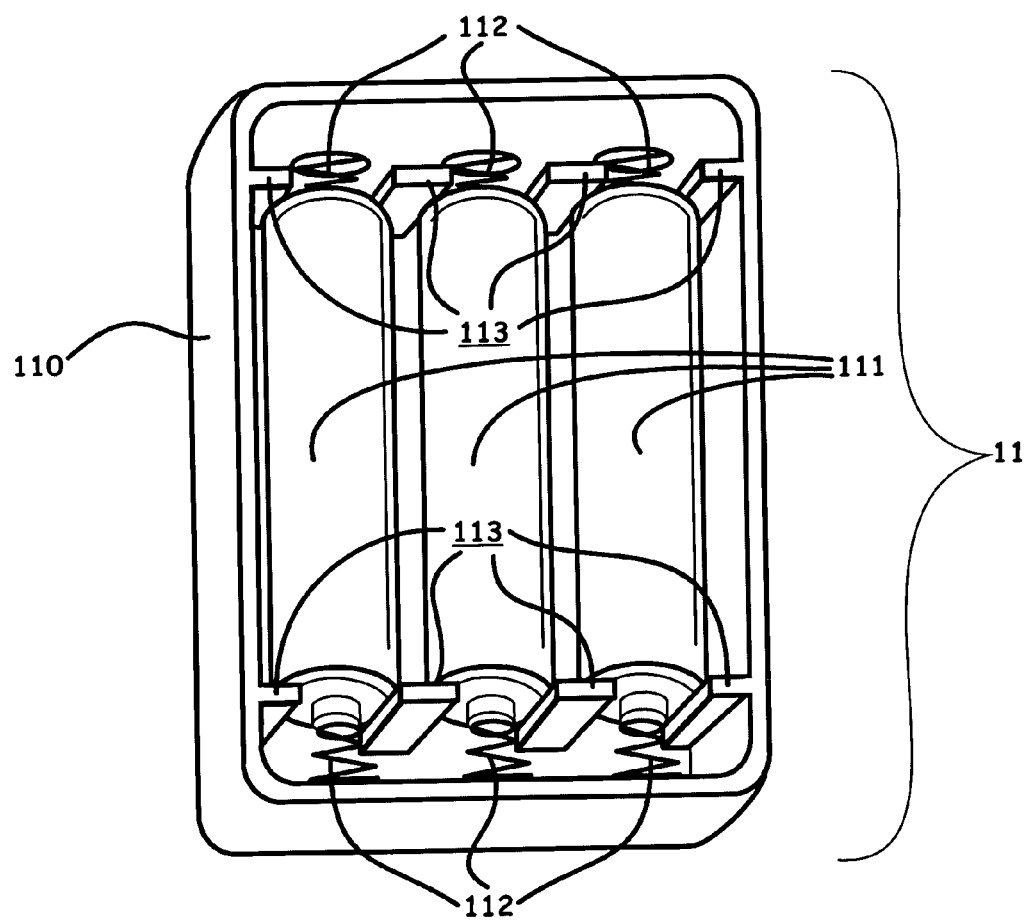
FIG. 10 is a perspective view of an open exemplary battery pack in an exemplary embodiment of the present invention.

FIG. 10 is a perspective view of an open exemplary battery pack 11 (depicted in FIG. 1a) in an exemplary embodiment of the present invention. An exemplary battery pack 11 (depicted in FIG. 1a) as depicted in FIG. 10 would comprise an external battery pack housing 110, a plurality of standing bosses 113 integral to the interior of the external battery pack housing 110, and a plurality of battery springs 112 with which to cushion the positive and negative ends of a plurality of batteries 111. Battery springs 112 would serve as flexible contacts at both ends of the batteries 111 to maintain electrical contact during movement of the device. The standing bosses 113 would mechanically limit movement of the respective batteries 111 within the battery pack housing 110. The mechanical limitation of battery movement will prevent excessive compression of the battery springs 112 and subsequent rebounding, sometimes referred to as "battery bounce," which can cause loss of contact between the batteries and the electrical contacts provided by the battery springs 112.

In the exemplary embodiment depicted in FIG. 1a, the various components of the two way communications system integrated in the life vest 7, including the antenna 1, a microphone, such as the throat microphone 5, an earpiece, such as earphone 3, and a power source, such as battery pack 11, would be operably connected to the transciever 6, such as with wire, or in the case of earphone 3, with acoustic conduction tubing.

In the exemplary embodiment depicted in FIG. 1a, the earphone 3 would be operably coupled to the transceiver 6 with acoustic conduction tubing, comprising an exterior portion 4 and a portion 14 that would be embedded in the material of the life vest 7. In the exemplary embodiment depicted in FIG. 1a, the portion 14 of the acoustic conduction tubing that is embedded in the life vest 7 and connected to the transceiver 6 is depicted with a dashed line to show that it would be beneath the surface layer of the life vest 7. For example, the portion 14 of the acoustic conduction tubing could be embedded between interior and exterior layers of material comprising the life vest 7 so that the portion 14 of the acoustic conduction tubing would not be visible from either the interior or exterior surface of the life vest 7.

In the exemplary embodiment depicted in FIG. 1a, the throat microphone 5 would be operably coupled to the transceiver 6 with microphone wire 15. In the exemplary embodiment depicted in FIG. 1a, microphone wire 15 is depicted with a dashed line to show that it would be beneath the surface layer of the life vest 7. For example, the microphone wire 15 could be embedded between interior and exterior layers of material comprising the life vest 7 so that the microphone wire 15 would not be visible from either the interior or exterior surface of the life vest 7.

In the exemplary embodiment depicted in FIG. 1a, the antenna 1 would be operably coupled to the transceiver 6 with antenna wire 13. In the exemplary embodiment depicted in FIG. 1a, antenna wire 13 is depicted with a dashed line to show that it would be beneath the surface layer of the life vest 7. For example, the antenna wire 13 could be embedded between interior and exterior layers of material comprising the life vest 7 so that the antenna wire 13 would not be visible from either the interior or exterior surface of the life vest 7. As depicted in FIG. 1a, the antenna 1 is mounted on the shoulder portion 10 of the front panel 7b opposite the front panel 7a into which the transceiver 6 is mounted. As depicted in FIG. 1a, the antenna wire 13 would be connected at one end to the antenna 1, and would extend, subsurface, through the back of vest 7, over the opposing shoulder and then be connected to the transceiver 6 which would be mounted in the opposite front panel 7a of the vest 7.

In the exemplary embodiment depicted in FIG. 1a, the battery pack 11 would be operably coupled to the transceiver 6 with battery pack wire 12. In the exemplary embodiment depicted in FIG. 1a, battery pack wire 12 is depicted with a dashed line to show that it would be beneath the surface layer of the life vest 7. For example, battery pack wire 12 could be embedded between interior and exterior layers of material comprising the life vest 7 so that the battery pack wire 12 would not be visible from either the interior or exterior surface of the life vest 7. As depicted in FIG. 1a, the battery pack 11 is mounted on the front panel 7b opposite the front panel 7a into which the transceiver 6 is integrated. As depicted in FIG. 1a, the battery pack wire 12 would be connected at one end to the battery pack 11, and would extend, subsurface, through the back of vest 7, and then be connected to the transceiver 6 which would be integral to the opposite front panel 7a of the vest 7.

It will be understood by someone with ordinary skill in the art that placement of components of the exemplary embodiment is illustrative and nonlimiting. Component placement in the exemplary embodiment attempts to balance weight of components at various points in the vest 7. However, other component placement schemes are possible without departing from the spirit of the present invention.

Figure 2:
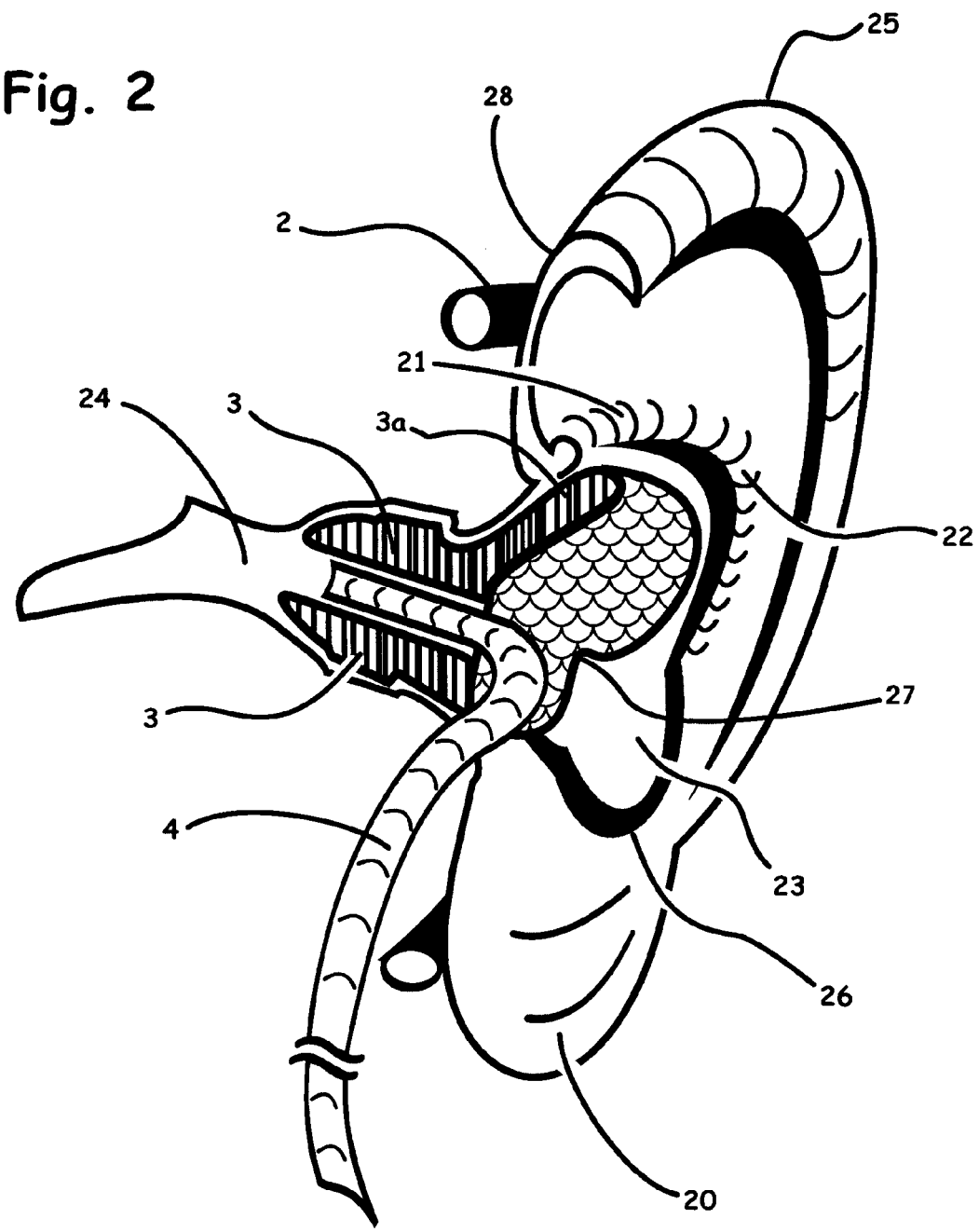
FIG. 2 is a perspective view of a human ear depicted in partial cross section, showing an exemplary earpiece and acoustic conduction tube in the exemplary embodiment of the present invention.

FIG. 2 is a perspective view of a human ear 25 depicted in partial cross section, showing an exemplary earpiece 3 and acoustic conduction tube 4 in the exemplary embodiment of the present invention. As depicted in FIG. 2, the exemplary earpiece 3 would be inserted into the ear canal 24 of the human ear 25. The acoustic conduction tube 4 would fit into and would pierce earpiece 3. The outer part 3a of earpiece 3 would fill the conchal bowl 23 between the inferior crux 21 portion of anthelix 22, the tragus 27 (small projection just in front of the ear canal that has been removed for clarity), and the antitragus 26 areas of the ear 25. The previously-described fit of earpiece 3 and the outer part 3a of earpiece 3 would provide a water resistant seal and would also act as a mechanical support for the acoustic conduction tube 4. Earclip 2 is shown continuing around the back of ear 25. Additional mechanical support is realized by placing the earclip 2 around the back of the helix 28 continuing around to the back of earlobe 20. These mechanical supports would aid fixed placement of earpiece 3 and attached acoustic conduction tube 4, even during rapid and intense accelerations.

Figure 3:
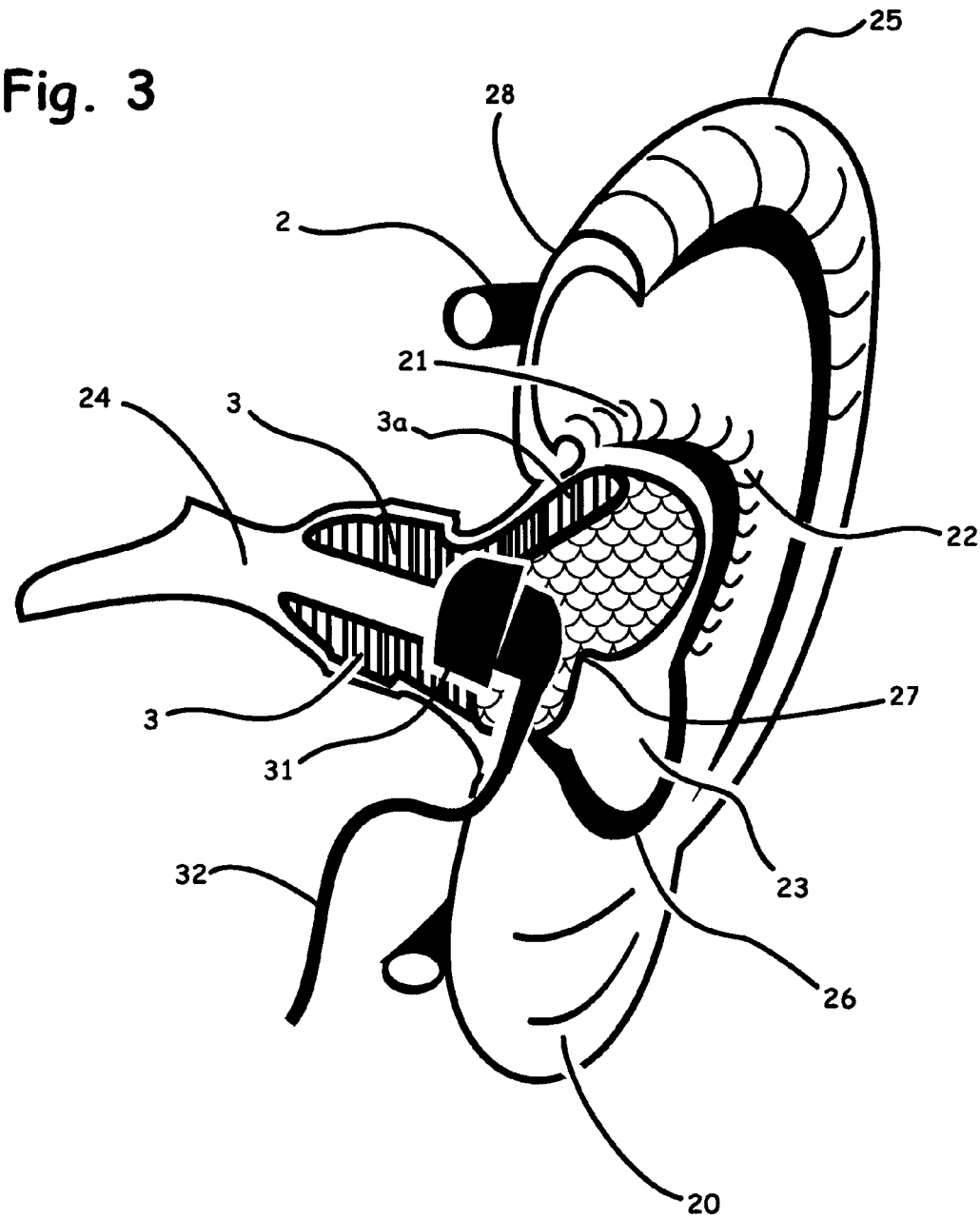
FIG. 3 is a perspective view of a human ear depicted in partial cross section, showing an exemplary earpiece and earbud speaker in an alternative exemplary embodiment of the present invention.

FIG. 3 is a perspective view of a human ear 25 depicted in partial cross section, showing an exemplary earpiece 3 and earbud speaker (also sometimes referred to as a transducer) 31 in an alternative exemplary embodiment of the present invention. As depicted in FIG. 3, the alternative embodiment therein depicted would have an earpiece 3 made of a soft, conformal, elastomeric material for placement in the ear canal 24. In the alternative embodiment depicted in FIG. 3, an earbud speaker 31 would be integrated in earpiece 3. A wire 32 would connect the earbud speaker 31 to the transceiver 6 (depicted in FIG. 1a). Wire 32 would provide electrical signals from the transceiver 6 (depicted in FIG. 1a) to earbud speaker 31.

Figure 4A:
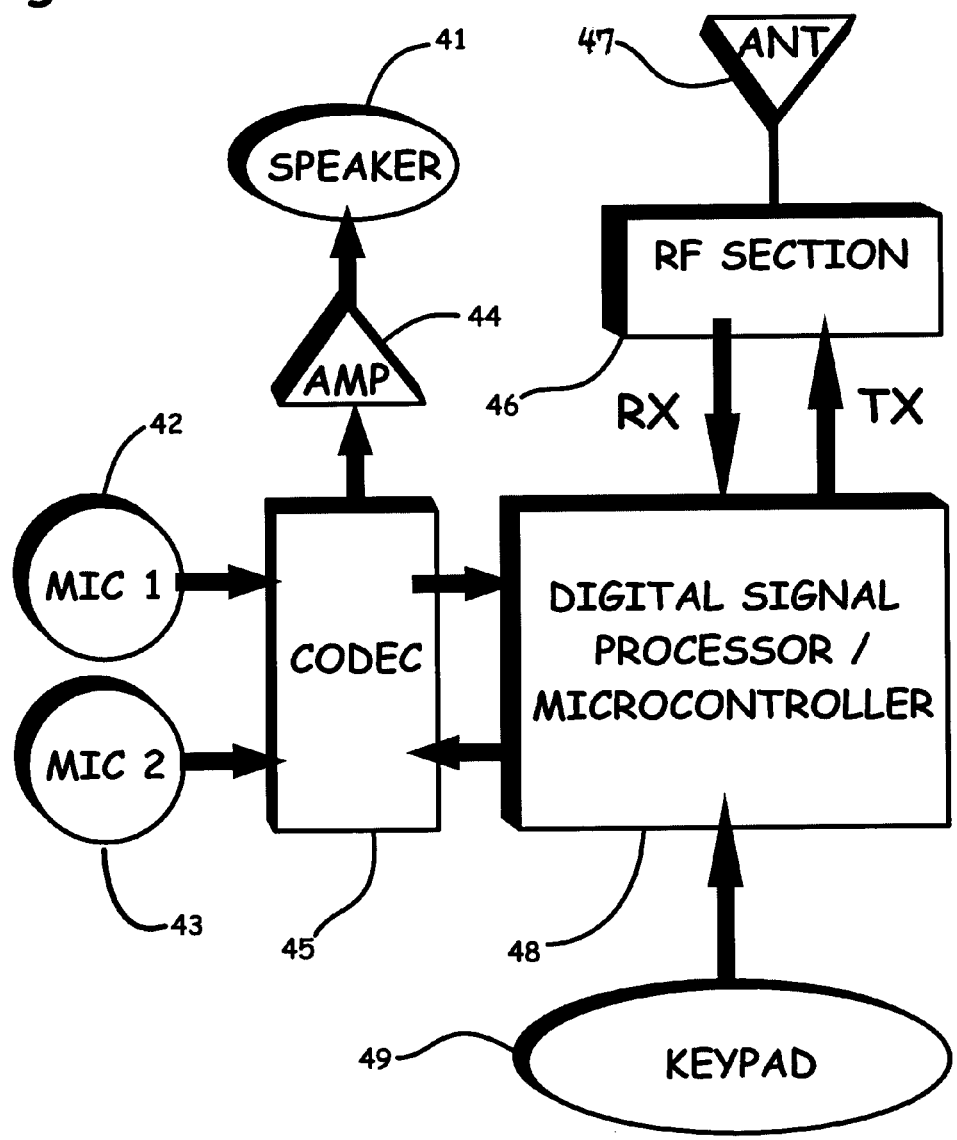
FIG. 4a is a high level block diagram of an exemplary transceiver in an exemplary embodiment of the present invention.

FIG. 4a is a high level block diagram of an exemplary transceiver (see element 6, FIG. 1a) in the exemplary embodiment of the present invention. The aquatic sports environment for which the present invention is contemplated for use can be acoustically difficult. There are often high levels of ambient noise in such environments. Further, contact and conduction microphones (such as throat microphone 5) do not always translate sound with great frequency response and fidelity. As is described in more detail below, FIG. 4a depicts a high level block diagram of an exemplary transceiver that is configured to compare audio input received from two different microphones in order to filter ambient noise and enhance high fidelity sound for actual voice content.

In the exemplary embodiment depicted in FIG. 4a, two microphones 42 and 43, respectively, would be provided. One of microphones 42 and 43 would be a first microphone 42 positioned to pick up audio from the wearer. The first microphone 42 would be, for example, the throat microphone 5 depicted in FIG. 1a. The other of microphones 42 and 43 would be a second microphone 43 of common design, such as an electret condenser. The second microphone 43 could be a microphone integrated with the transceiver 6 (FIG. 1a), or otherwise integrated into the life vest 7 (FIG. 1a). For example, second microphone 18 (which is an external view of second microphone 43 depicted in FIG. 4a) is depicted in FIG. 1a as being integrated with transceiver 6. The primary purpose of the second microphone 43 (FIG. 4a) would be to pick up ambient noise.

Continuing with reference to FIG. 4a, audio from both microphones 42 and 43 would be digitally encoded and compressed by CODEC (compressor/decompressor/encoder/decoder) 45. Digital encoding of the audio would include an identification of the source microphone, i.e., microphone 42 or 43, respectively, of the audio, and would include a timing identification. As depicted in FIG. 4a, compressed, digitized audio from CODEC 45 would flow into a digital signal processor/microcontroller 48 (sometimes referred to herein as the microcontroller 48). Microcontroller 48 would filter compressed, digitized audio from CODEC 45 to yield only audio in the narrow audio spectrum required by the FRS transceiver, namely, in the frequency response 300 Hz to 3.125 KHz. In addition to filtering out ambient noise, the aforementioned filtering would reduce unwanted low frequency laryngeal noises such as swallowing.

In order to filter the audio, microcontroller 48 would differentially compare audio from first microphone 42 with audio from second microphone 43 in order to determine the difference between the two audio streams. The result of the aforementioned differential comparison would be an identification of the difference between the two audio signals. By filtering out the difference, and keeping audio in the narrow audio spectrum required by the FRS transceiver, namely, in the frequency response 300 Hz to 3.125 KHz, the result is high fidelity voice content.

Figure 4B:
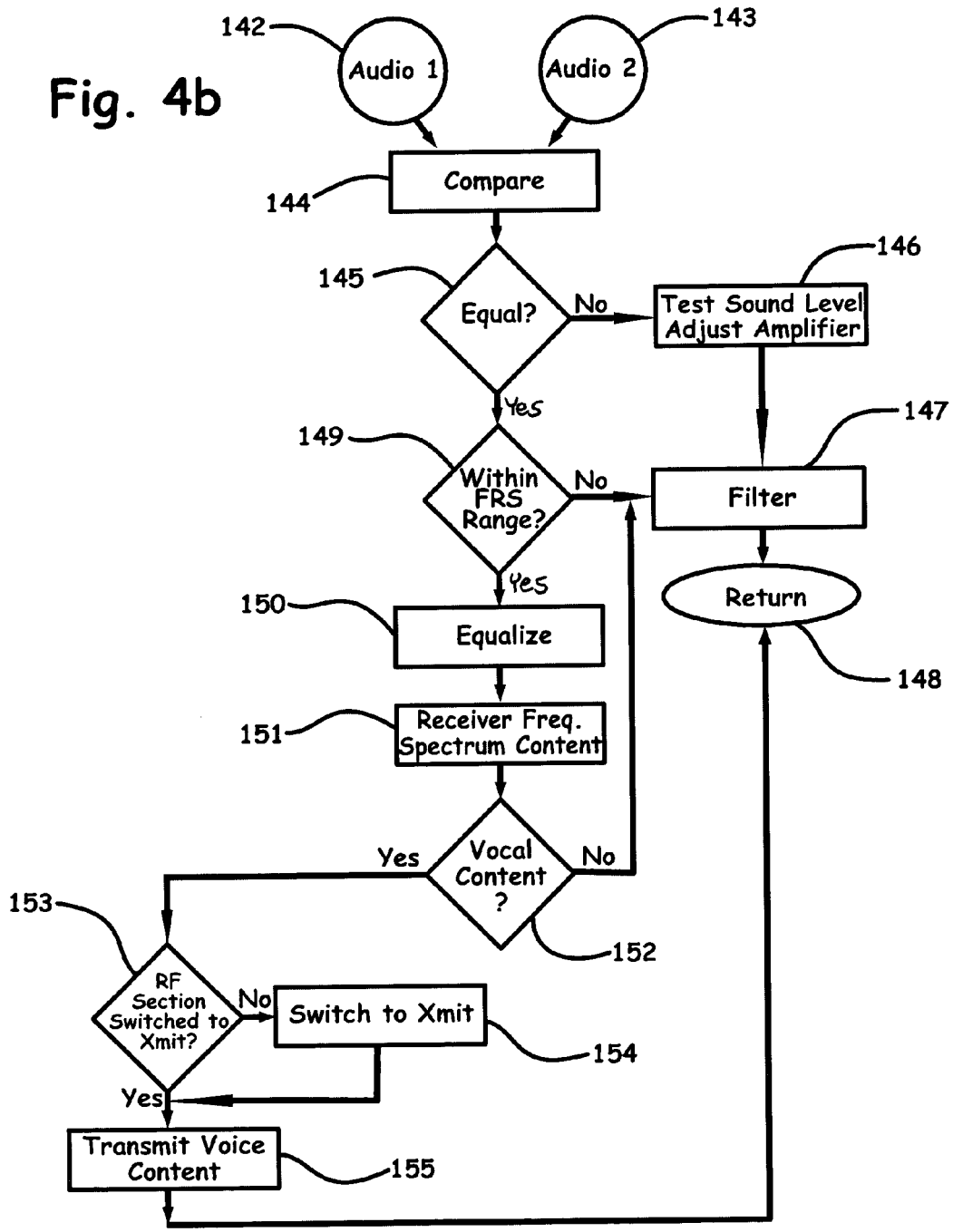
FIG. 4b is a high level flow diagram depicting exemplary high level audio signal processing by an exemplary microcontroller in an exemplary transceiver in an exemplary embodiment of the present invention.

FIG. 4b is a high level flow diagram depicting exemplary high level audio signal processing by an exemplary microcontroller 48 in an exemplary transceiver (element 6 in FIG. 1a) in an exemplary embodiment of the present invention. As depicted in FIG. 4b, compressed, digitized audio 142 from the first microphone (element 42 in FIG. 4a) and concurrent compressed, digitized audio 143 from the second microphone (element 43 in FIG. 4a) would be compared 144. The two audio inputs would be tested for equality 145; if not equal, then the sound is ambient noise and is filtered 147 out as nonvoice. If the two audio inputs are equal, then the audio input from the first microphone would be tested 149 to determine if the audio signal is within the frequency response 300 Hz to 3.125 KHz. If the audio signal from the first microphone is outside the frequency response 300 Hz to 3.125 KHz, then the audio signal is filtered 147 out as nonvoice.

If, on the other hand, the audio signal from the first microphone is within the frequency response 300 Hz to 3.125 KHz, then the audio signal will be processed further. Next, the frequency response of the first microphone is equalized 150. The audio is further companded (compand is a term understood by someone with ordinary skill in the art as meaning compress/expand) by microcontroller 48 (FIG. 4*a*) in a 2 to 1 log curve so as to recover 151 frequency spectrum content lost in the narrow bandwidth FM modulation.

Continuing with reference to FIG. 4*b*, audio signals from the first microphone are then analyzed 152 for true vocal content. Vocal content testing is done using algorithms that compare the audio to standard phonemes and frequencies used in common speech. If true vocal output is detected, the RF Section (element 46 in FIG. 4*a*) is tested 153 to determine if it has been switched to transmit. If the RF Section (element 46 in FIG. 4*a*) has not been switched to transmit, it is switched 154 into transmit mode. The RF energy of the voice content is then transmitted 155. In this way the digital signal processing of the microcontroller 48 (FIG. 4*a*) enhances the voice-operated switch, or VOX as it is commonly known. The signal processing described serves to mitigate false switching into transmit mode which is a problem that sometimes occurs in audio-level-sensitive VOX systems.

Returning with reference to FIG. 4*a*, the exemplary microcontroller 48 would be programmed to recognize voice commands.

With reference to FIG. 4*a*, the RF energy of the voice content is transmitted by radiating the RF energy through antenna 47 (antenna 47 depicted in FIG. 4*a* is the electronic component of antenna 1 depicted in FIG. 1*a*). Audio from the second microphone 43 is used by the microcontroller 48 as a reference point for controlling audio level. As the microcontroller 48 detects an increase in the ambient noise level, the microcontroller 48 instructs AMP (amplifier) 44 to increase the audio level of the sound transmitted to speaker 41.

Returning to FIG. 4*b*, the sound level of audio from the second microphone may be tested, for example, during signal processing, such as is depicted in block 146 of FIG. 4*b*. Depending on the sound level detected, the microcontroller (element 48, FIG. 4*a*) may adjust the amplifier (element 44, FIG. 4*a*) to increase the audio level of the sound transmitted to speaker 41 (FIG. 4*a*).

Returning to FIG. 4*a*, in the exemplary embodiment, microcontroller 48 would be programmed and configured to translate both tactile inputs from, e.g., keypad 49 (element 49 in FIG. 4*a* is the electronic component for keypad elements 53, 53*a*, and 54 depicted in FIG. 5), and voice inputs from the first microphone 42. Examples of voice commands would be "Volume Up" or "Channel Seven."

In the exemplary embodiment, microcontroller 48 would also be configured/programmed to provide voice generation, such as, for providing voice cues. Voice generation would allow the transceiver 6 to announce its current settings through speaker 1 without visual cues. Examples of voice-generated cues would be "Volume 7", "Check Batteries" and "Code 5."

It will be understood by someone with ordinary skill in the art that alternative approaches could be used to filter non-voice sounds. Rather than digitizing sounds picked up by the two microphones 42 and 43 and processing the digitized sounds with the microcontroller 48 (FIG. 4*a*), an alternative way to filter nonvoice would be to use analog circuitry to compare the sounds from the two microphones 42 and 43.

Figure 5:
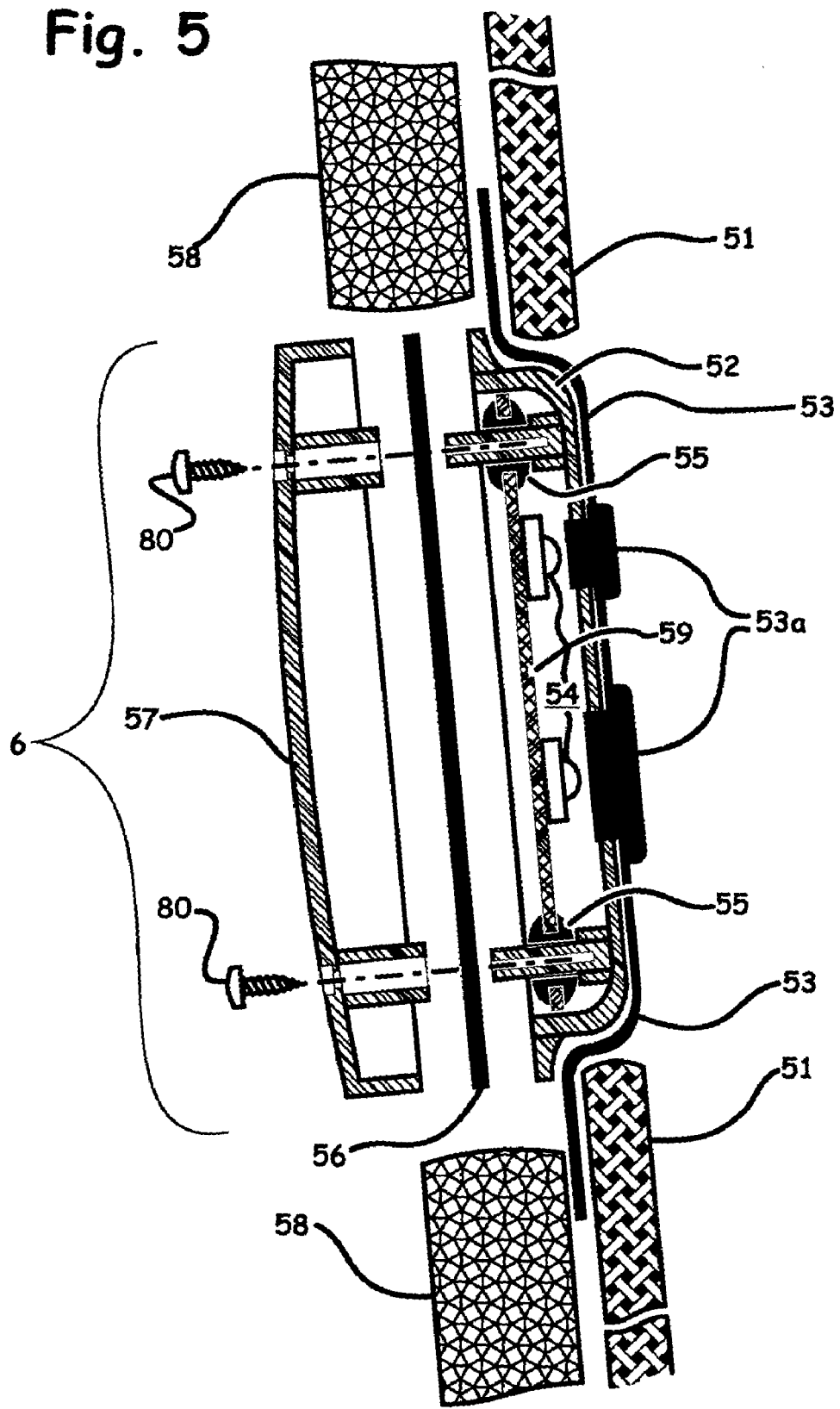
FIG. 5 is an enlarged cross-sectional view of an exemplary transceiver integrated into an exemplary personal flotation device in an exemplary embodiment of the present invention.

FIG. 5 is an enlarged cross-sectional view of an exemplary transceiver 6 as depicted in FIG. 1*a* as would be integrated into an exemplary life vest 7 in an exemplary embodiment of the present invention. Because the contemplated operating environment for the present invention can be a hostile one, the exemplary embodiment of the present invention provides measures to mitigate extremes in shock, vibration, water, and noise. Transceivers of common variety perform poorly in aquatic environments where they are subject to extremes in shock, vibration, water, and noise.

As depicted in FIG. 5, the exemplary transceiver 6 (see also element 6 in FIG. 1*a*) would comprise a transceiver front housing 52, a rear transceiver housing 57, an electronic circuit board(s) 59 with a plurality of discrete tactile switches 54, and a molded silicon rubber keypad 53 with a plurality of keypad buttons 53*a* for contacting corresponding discrete tactile switches 54.

As depicted in FIG. 5, the exemplary embodiment would provide elastomeric material 51, such as, e.g., "neoprene", bonded by means of sewing and adhesive to a molded silicon rubber keypad 53. A molded silicon rubber keypad 53 would be bonded adhesively to transceiver front housing 52. The exemplary elastomeric material bonding would provide a first level of environmental hardening. Transceiver front housing 52 and rear transceiver housing 57 in the exemplary embodiment would be made from UV light and impact-resistant plastic compounds such as ABS polycarbonate blends. The exemplary embodiment design elements enhance robust performance in adverse conditions.

To provide shock and vibration mitigation, foam flotation material 58 and elastomeric material 51 would surround the exemplary transceiver 6. The electronic circuit boards 59 would be held in place by elastomeric vibration isolators 55. The modular nature of the components used in the exemplary embodiment would minimize the mass of any one piece. The level of resistance to shock and vibration can be expected to meet or exceed Military Standard Specification 810E.

In order to provide water ingress protection, front transceiver housing 52 and rear transceiver housing 57 would be screwed together with screws 80. Elastomeric gasket 56 would make a watertight seal between front transceiver housing 52 and rear transceiver housing 57. Internal water vapor condensation and corrosion would be mitigated through a combination of charging the housings with dry nitrogen and enclosing a desiccant. Water ingress protection is expected to meet or exceed international standard CEI/IEC 529: 1989: IPX 7.

The entire transceiver housing assembly (element 6 in FIG. 1*a*) 51–59 and 80 (FIG. 5), would be embedded in the material comprising the life vest 7. In the exemplary embodiment, only a portion of the keypad 53 would be visible from the exterior surface of the life vest 7 as depicted in FIG. 1*a*. In some embodiments, the entire transceiver housing assembly (element 6 in FIG. 1*a*) 51–59 and 80 (FIG. 5), would be protected with an outer layer of water-resistant, transparent material, which itself would be available for tactile contact.

Figure 6:
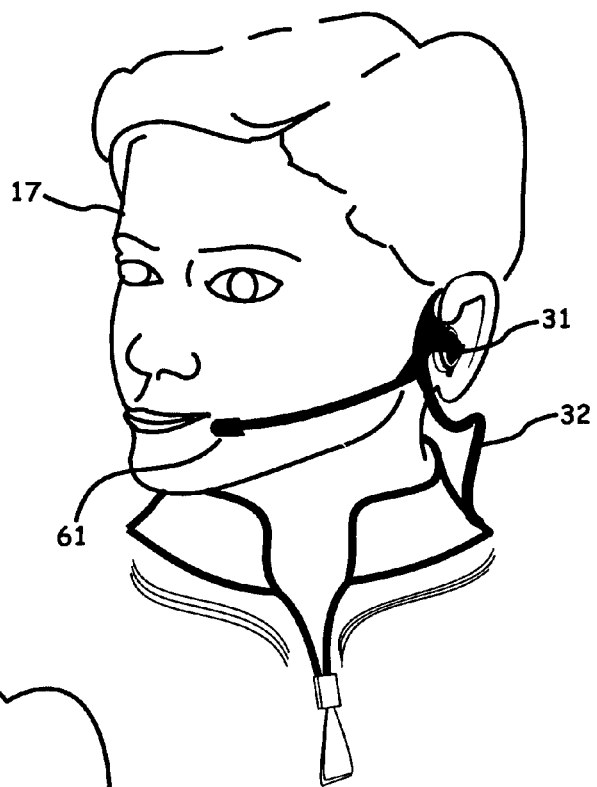
FIG. 6 is a perspective view of a human wearing an earbud speaker and boom microphone in an alternative exemplary embodiment of the present invention.

FIG. 6 is a perspective view of a human 17 wearing an earbud speaker 31 and boom microphone 61, such as a noise canceling boom microphone, in an alternative exemplary embodiment of the present invention. In the alternative exemplary embodiment depicted in FIG. 6, audio input from the wearer 17 would be received through boom microphone 61. Earbud speaker 31 would provide audio to the wearer 17 through wire 32 which would be connected to the transceiver (element 6 in FIG. 1*a*).

Figure 7:
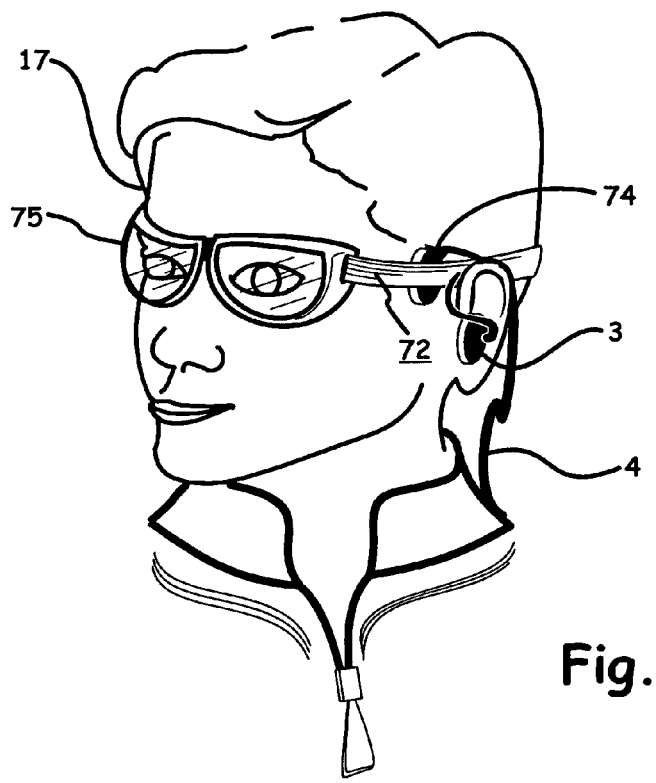
FIG. 7 is a perspective view of a human wearing an earbud speaker and conduction microphone in an alternative exemplary embodiment of the present invention.

FIG. 7 is a perspective view of a human 17 wearing an earbud speaker 31 and bone conduction microphone 74 in an alternative exemplary embodiment of the present invention. In the alternative exemplary embodiment depicted in FIG. 7, bone conduction microphone 74 would be held in place by a headband 72 of a set of aquatic sport goggles 75. The bone conduction microphone 74, held against the skull of the wearer 17 by the headband 72 of aquatic goggle 75, would pick up audio conducted through the human skull. Earbud speaker 31 would be any of a common variety and would provide audio to the user.

Figure 8:
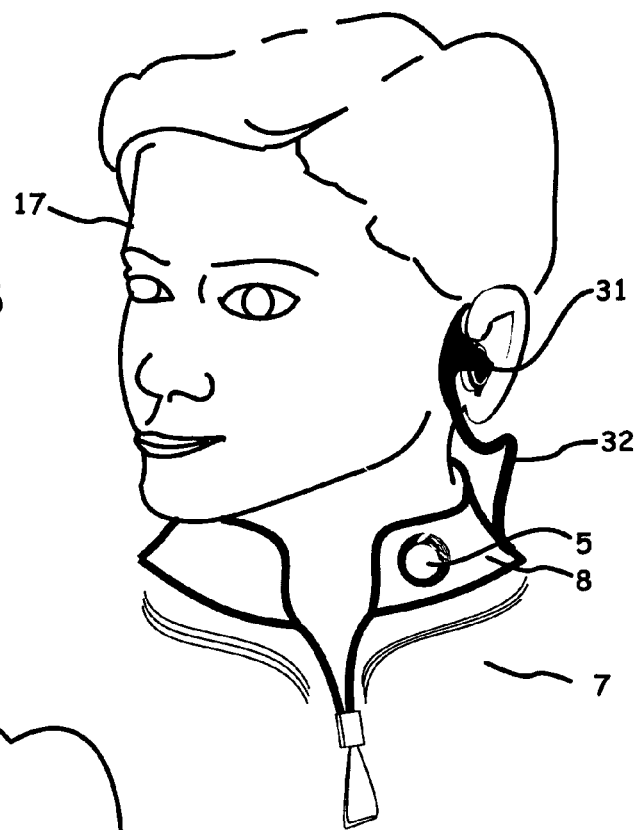
FIG. 8 is a perspective view of a human wearing an earbud speaker and throat microphone in an alternative exemplary embodiment of the present invention.

FIG. 8 is a perspective view of a human 17 wearing an earbud speaker 31 and a throat microphone 5 in an alternative exemplary embodiment of the present invention. In the alternative exemplary embodiment depicted in FIG. 8, the throat microphone 5 would be integrated into the collar 8 of the life vest 7. Audio would be provided to the wearer 17 through earbud speaker 31. Electrical signals would be relayed between the transceiver (element 6 in FIG. 1a) and the earbud speaker 31 by means of wire 32.

Figure 9:
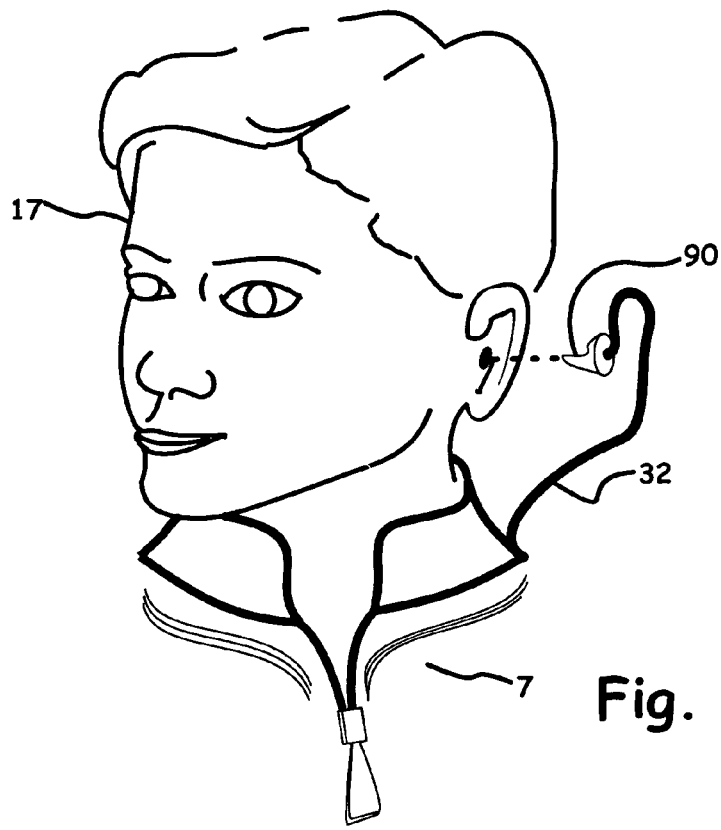
FIG. 9 is a perspective view of a human wearing an ear insert comprising an earbud speaker and an earbud microphone in an alternative exemplary embodiment of the present invention.

FIG. 9 is a perspective view of a human wearing an ear insert 90 comprising an earbud speaker and an earbud microphone in an alternative exemplary embodiment of the present invention. In the alternative exemplary embodiment depicted in FIG. 9, ear insert 90 would have a microphone and a speaker integrated into its structure. Electrical signals would be relayed between the transceiver (element 6 in FIG. 1a) and the ear insert 90 by means of wire 32.

Trademarks

Jet Ski®, Sea-Doo®, and the names of actual companies, products and standards mentioned herein may be the trademarks, and/or registered trademarks, of their respective owners.

Facsimile Reproduction of Copyright Material

A portion of the disclosure of this patent document contains material which is subject to copyright protection by the copyright owner, Robert Foth, his successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A two-way communications device for aquatic sports, said device comprising:
    a life vest;
    a two-way transceiver embedded in the life vest; and
    an antenna connected to a shoulder portion of the life vest, such that the antenna forms an arc relative to the shoulder portion of the life vest, wherein a middle portion of the antenna is separated from the shoulder portion of the life vest.

2. The two-way communications device for aquatic sports of claim 1, wherein said antenna is connected with wires to the two-way transceiver and wherein the wires are embedded in the life vest.

3. The two-way communications device for aquatic sports of claim 1, wherein the transceiver is sealed in a waterproof housing embedded in the life vest.

4. The two-way communications device for aquatic sports of claim 2, wherein said antenna comprises a first end, a second end, and the middle portion, wherein the first end of the antenna is attached to a first portion of the shoulder portion of the life vest, wherein the second end of the antenna is attached to a second portion of the shoulder portion of the life vest.

5. The two-way communications device for aquatic sports of claim 1, said device further comprising:
    at least a first portion of material, wherein the at least a first portion of material is adapted for allowing fluid to pass therethrough, and wherein the at least a first portion of material spans the arc formed between the antenna and the shoulder portion of the vest.

6. The two-way communications device for aquatic sports of claim 1, said device further comprising:
    a microphone embedded in a collar portion of the life vest.

7. The two-way communications device for aquatic sports of claim 1, said device further comprising:
    a transducer; and
    a flexible acoustic conduction tube, said flexible acoustic conduction tube comprising a first end and a second end, wherein the first end of the flexible acoustic conduction tube is connected to the transducer, and wherein the second end of the flexible acoustic conduction tube is connected to the transceiver.

8. The two-way communications device for aquatic sports of claim 2, said device further comprising:
    a microphone embedded in a collar portion of the life vest.

9. The two-way communications device for aquatic sports of claim 2, said device further comprising:
    a transducer; and
    a flexible acoustic conduction tube, said flexible acoustic conduction tube comprising a first end and a second end, wherein the first end of the flexible acoustic conduction tube is connected to the transducer, and wherein the second end of the flexible acoustic conduction tube is connected to the transceiver.

10. The two-way communications device for aquatic sports of claim 1, wherein said transceiver is operable for communication of radio frequencies between 462.5625 MHz and 467.7125 MHz.

11. The two-way communications device for aquatic sports of claim 10, said device further comprising:
    a first microphone embedded in a collar portion of the life vest.

12. The two-way communications device for aquatic sports of claim 11, said device further comprising:
    a transducer; and
    a flexible acoustic conduction tube, said flexible acoustic conduction tube comprising a first end and a second end, wherein the first end of the flexible acoustic conduction tube is connected to the transducer, and wherein the second end of the flexible acoustic conduction tube is connected to the transceiver.

13. The two-way communications device for aquatic sports of claim 11, said device further comprising:
   a second microphone connected to the transceiver; and
   wherein the transceiver is programmed to compare sound picked up by the first microphone with sound picked up by the second microphone.

14. A method of providing two-way communications for aquatic sports participants, said method comprising:
   embedding a first two-way transceiver in a life vest;
   connecting a first antenna to a shoulder portion of the life vest;
   embedding in the life vest a first set of wires connecting the first transceiver to the first antenna;
   embedding a second two-way transceiver in one of: a second life vest or a mobile unit, wherein said first two-way transceiver and said second two-way transceiver are operable to communicate with each other; and
   connecting the first antenna to the shoulder portion of the life vest, such that the antenna forms an arc between the antenna and the shoulder portion of the life vest.

15. A two-way communications device for aquatic sports, said device comprising:
   a life vest;
   a two-way transceiver;
   an antenna connected to the life vest, wherein said antenna is connected to the two-way transceiver;
   a first microphone connected to the two-way transceiver; and
   a second microphone connected to the two-way transceiver, wherein the two-way transceiver is programmed to compare sound picked up by the first microphone with sound picked up by the second microphone.

16. The device of claim 15, wherein said two-way transceiver is operable for communication of radio frequencies between 462.5625 MHz and 467.7125 MHz.

17. The device of claim 15, wherein said antenna is connected with wires to the two-way transceiver, wherein the wires are embedded in the life vest and wherein the two-way transceiver is embedded in the life vest.

18. The device of claim 15, wherein the first microphone is embedded in a collar portion of the life vest.

19. The device of claim 15, wherein the antenna is connected to a shoulder portion of the life vest.

20. The device of claim 15, wherein:
   said antenna is connected with wires to the two-way transceiver, wherein the wires are embedded in the life vest;
   the first microphone is embedded in a collar portion of the life vest; and
   the antenna is connected to a shoulder portion of the life vest.

21. The device of claim 15, wherein:
   said two-way transceiver is operable for communication of radio frequencies between 462.5625 MHz and 467.7125 MHz;
   said antenna is connected with wires to the two-way transceiver, wherein the wires are embedded in the life vest;
   the first microphone is embedded in a collar portion of the life vest; and
   the antenna is connected to a shoulder portion of the life vest.

* * * * *